United States Patent [19]
Bartlett et al.

[11] Patent Number: 5,439,947
[45] Date of Patent: Aug. 8, 1995

[54] POLYMER FOAMS CONTAINING BLOCKING AGENTS

[75] Inventors: Philip L. Bartlett; Joseph A. Creazzo, both of Wilmington; Howard S. Hammel, Bear, all of Del.

[73] Assignee: E. I. Du Pont de Nemours and Company, Wilmington, Del.

[21] Appl. No.: 973,599

[22] Filed: Nov. 9, 1992

Related U.S. Application Data

[63] Continuation of Ser. No. 577,045, Aug. 28, 1990, abandoned, which is a continuation-in-part of Ser. No. 500,051, Mar. 23, 1990, abandoned.

[51] Int. Cl.$^6$ .......................... C08J 9/02; C08L 25/06; C08L 75/04
[52] U.S. Cl. ...................... 521/131; 521/134
[58] Field of Search .......................... 521/131

[56] References Cited

U.S. PATENT DOCUMENTS

| | | | |
|---|---|---|---|
| 3,222,304 | 12/1965 | Ingram | 260/2.5 |
| 3,391,093 | 7/1968 | Frost . | |
| 3,671,470 | 6/1972 | Case | 521/131 |
| 3,922,238 | 11/1975 | Narayan et al. . | |
| 3,984,597 | 10/1976 | Haack et al. | 428/220 |
| 4,156,703 | 5/1979 | Harrop | 260/876 |
| 4,243,717 | 1/1981 | Gahmig | 428/402 |
| 4,251,584 | 2/1981 | Engelen et al. | 428/159 |
| 4,337,318 | 6/1982 | Doyle | 521/80 |
| 4,359,539 | 11/1982 | Hoki et al. | 521/79 |
| 4,370,378 | 1/1983 | Zabrocki et al. | 428/339 |
| 4,379,859 | 4/1983 | Hirosawa et al. | 521/59 |
| 4,427,795 | 1/1984 | Dorrestijn et al. | 521/134 |
| 4,515,907 | 5/1985 | McCullough et al. | 521/139 |
| 4,572,865 | 2/1986 | Gluck et al. | 428/309 |
| 4,636,529 | 1/1987 | Crooker | 521/131 |
| 4,640,933 | 2/1987 | Park | 521/94 |
| 4,663,361 | 5/1987 | Park | 521/94 |
| 4,694,026 | 9/1987 | Park | 521/94 |
| 4,694,027 | 9/1987 | Park | 521/94 |
| 4,789,690 | 12/1988 | Milovanovic-Lerik et al. | 521/137 |
| 4,795,763 | 1/1989 | Gluck et al. | 521/99 |
| 4,894,395 | 1/1990 | Park | 521/79 |
| 4,898,893 | 2/1990 | Ashida | 521/131 |
| 4,927,863 | 5/1990 | Bartlett et al. | 521/131 |
| 4,931,482 | 6/1990 | Lamberts et al. | 521/131 |
| 4,931,484 | 6/1990 | Hovis et al. | 521/149 |
| 4,945,119 | 7/1990 | Smits et al. | 521/131 |
| 4,972,002 | 11/1990 | Volkert | 521/120 |
| 4,972,003 | 11/1990 | Grünbauer et al. | 521/131 |
| 4,981,879 | 1/1991 | Snider | 521/131 |
| 4,996,242 | 2/1991 | Lin | 521/131 |
| 4,997,706 | 3/1991 | Smits et al. | 428/304 |
| 5,001,164 | 3/1991 | Smits et al. | 521/131 |
| 5,032,623 | 7/1991 | Keske et al. | 521/143 |
| 5,120,770 | 6/1992 | Doyle et al. | 521/99 |
| 5,137,934 | 8/1992 | Williamson et al. | 521/170 |

FOREIGN PATENT DOCUMENTS

| | | |
|---|---|---|
| 990900 | of 1976 | Canada . |
| 0001791 | 5/1979 | European Pat. Off. . |
| 0024324 | 3/1981 | European Pat. Off. . |
| 0305084 | 3/1989 | European Pat. Off. . |
| 0345580 | 12/1989 | European Pat. Off. . |
| 88849 | 12/1960 | France . |
| 60-110733 | 6/1985 | Japan . |
| 1442858 | 7/1976 | United Kingdom . |

OTHER PUBLICATIONS

Rolf Wiedermann, English Translation of EP 0,345,580, Dec. 1989.
M. Mann et al., CFC-Blowing Agents In Rigid Foam Materials, Nov. 1989.
K. T. Dishart et al., The DuPont Program On Fluorocarbon Alternative Blowing Agents For Polyurethane Foams, Oct. 1987.
"A Fundament Study of the Thermal Conductivity Ageing of Rigid PUR Foam . . . " Cunningham et al. 32nd Annual Polyurethane Technical/Marketing Conf., Oct. 1–4, 1989 pp. 56–62.
"Permeation Studies For HCFCs In Rigid Polyurethane Foams" DuPont brochure 1989.

*Primary Examiner*—Joseph L. Schofer
*Assistant Examiner*—John M. Cooney, Jr.
*Attorney, Agent, or Firm*—Michael K. Boyer

[57] ABSTRACT

An improved closed cell polymer foam and foaming agent involving the use of a hydrogen-containing halocarbon blowing agent (e.g., HCFC-22) in combination with an effective amount of a hydrogen bond forming blocking agent (e.g., organic ether, ester or ketone). The presence of the blocking agent is shown to significantly reduce the escape of blowing agent from and entry of air into the foam resulting in low thermal conductivity over a longer period of time and improved thermal insulation value.

28 Claims, No Drawings

POLYMER FOAMS CONTAINING BLOCKING AGENTS

This is a continuation of application Ser. No. 07/577,045, filed Aug. 28, 1990, now abandoned, which is a continuation-in-part of application Ser. No. 07/500,051, filed Mar. 23, 1990, now abandoned.

BACKGROUND OF THE INVENTION

1. Field of the Invention

This invention relates to improved polymer foams and foaming agents by the use of blocking agents. More specifically, the invention relates to combinations of a hydrogen bond forming blocking agent and a hydrogen-containing halocarbon and a method of using the same in closed cell polymer foams to reduce permeation of air and/or hydrohalocarbon, thereby maintaining low thermal conductivity and improved thermal insulation value of the foam.

2. Description of Related Art, including Information Disclosed under §§1.97-1.99

It is generally known and an accepted commercial practice to add a blowing agent to various polymeric materials during fabrication such as to produce a cellular (expanded foam) material. Typically, the blowing agent can be either a reactive solid or liquid that evolves a gas, a liquid that vaporizes, or a compressed gas that expands during final fabrication producing the desired polymeric foam. Such foams are categorically either closed cell (i.e., non-porous, continuous polymer phase with discontinuous gas phase dispersed therein) or open cell (porous) foams which are advantageously employed in various end use applications and exhibit various advantages associated with the particular type of foam produced. In describing the closed cell foam as involving a discontinuous gas phase, it should be appreciated that this description is an over simplification. In reality the gas phase is dissolved in the polymer phase and there will be a finite substantial presence of gas (blowing agent) in the polymer. Furthermore and as generally known in the art, the cell gas composition of the foam at the moment of manufacture does not necessarily correspond to the equilibrium gas composition after aging or sustained use. Thus, the gas in a closed cell foam frequently exhibits compositional changes as the foam ages leading to such known phenomenon as increase in thermal conductivity or loss of insulation value.

Closed cell foams are usually employed for their reduced thermal conductivity or improved thermal insulation properties. Historically, insulating polyurethane and polyisocyanurate foams have been made using trichlorofluoromethane, $CCl_3F$ (CFC-11), as the blowing agent. Similarly, insulating phenolic foam is known to be made from phenol-formaldehyde resins (typically via an intermediate resole mixture involving a phenol-formaldehyde oligomer condensate) using blends of 1,1,2-trichlorotrifluoroethane, $CCl_2FCClF_2$ (CFC-113), and CFC-11 as the blowing agent. Also, insulating thermoplastic foam such as polystyrene foam is commonly manufactured using dichlorodifluoromethane, $CCl_2F_2$ (CFC-12), as the blowing agent.

The use of a chlorofluorocarbon as the preferred commercial expansion or blowing agent in insulating foam applications is in part based on the resulting k-factor (i.e., the rate of transfer of heat energy by conduction through one square foot of one inch thick homogenous material in one hour where there is a difference of one degree Fahrenheit perpendicularly across the two surfaces of the material) associated with the foam produced. Thus, it is generally known and accepted that a chlorofluorocarbon gaseous phase within the closed cell is a superior thermal barrier relative to other inexpensive gases such as air or carbon dioxide. Conversely, the natural intrusion of air into the foam over time and to a lesser extent the escape of the chlorofluorocarbon from the cell is deleterious to the desired low thermal conductivity and high insulative value of the foams. Also, the escape of certain chlorofluorocarbons to the atmosphere is now recognized as potentially contributing to the depletion of the stratospheric ozone layer and contributing to the global warming phenomenon. In view of the environmental concerns with respect to the presently used chlorofluorocarbon blowing agents, it is now generally accepted that it would be more desirable to use hydrochlorofluorocarbons or hydrofluorocarbons rather than the chlorofluorocarbons. Consequently, the need for a method or way of inhibiting the permeation of air and blowing agent through the polymer phase of the polymeric foam exists and hopefully any such solution to the problem would be effective in inhibiting the permeation of the proposed alternative halocarbons.

Historically, various methods and compositions have been proposed, with varying degree of success, to alleviate and/or control problems associated with permeation of gases into and out of polymeric foams. For example, in U.S. Pat. No. 4,663,361 the problem of shrinkage (lack of dimensional stability) associated with using any blowing agent other than 1,2-dichlorotetrafluoroethane in the manufacture of foamed polyethylene is addressed. In this reference, a stability control agent is used in either a homopolymer or copolymer of ethylene wherein the blowing agent is isobutane or isobutane mixed with another hydrocarbon or a chlorocarbon, fluorocarbon or chlorofluorocarbon. The stability control agent is either partial esters of long chain fatty acids with polyols, higher alkyl amines, fatty acid amides, olefinically unsaturated carboxylic acid copolymers, or polystyrene. This reference also describes other prior art and is included by reference for such purpose.

In U.S. Pat. No. 4,243,717 a Fischer-Tropsch wax is added to expanded polystyrene beads to produce a stable cell structure in the foam, without specific reference to the permeation of blowing agent or air. In Canadian Patent 990,900 the use of a barrier material or blocking agent is disclosed to alleviate the problem of gas migration through the cell wall specifically at the time of foaming. The particular problem addressed in this Canadian patent is the rupture and total collapse of the cell walls that frequently occur in the manufacture of closed cell polyethylene foam. This problem is attributed to the fact that the cell walls for such foams are permeable to the rapidly expanding gas under the influence of the heat liberated by the exothermic polymer crystallization. The specific solution disclosed in this reference is to use a blend of polyethylene and polypropylene along with a barrier resin such as an elastomer containing polystyrene or acrylic resin which are intended to contribute high melt strength to the cell wall at the foaming temperature. An inert nucleant is also employed along with at least two gaseous propellants of substantially different vapor pressures.

In U.S. Pat. No. 4,795,763 the use of at least 2 percent carbon black as a filler uniformly dispersed in a polymeric foam is shown to reduce the aged k-factor of the foam to below the aged k-factor of the corresponding unfilled foam.

SUMMARY OF THE INVENTION

The present invention provides a method of preventing or slowing down both the rate of intrusion or permeation of air into the closed cells of a polymeric foam as well as preventing or slowing down the escape of the blowing agent by permeation or migration out of the polymer foam cells. Thus, according to the present invention the effective rate of permeation of air and/or hydrohalocarbon across the polymeric phase of the foam is substantially reduced by virtue of the presence of a blocking agent. Further according to the present invention a blocking agent capable of hydrogen bond formation with the hydrogen-containing halocarbon is incorporated into the polymeric foam and thus tends to form hydrogen bonds with the blowing agent. This in turn dramatically reduces the permeation rate of the hydrogen-containing blowing agent retaining it in the foam. The presence of the blocking agent also functions to reduce entry of air into the polymer foam. By reducing the entry of air into insulating foam and simultaneously reducing the permeation of blowing agents out of insulating foam, the blocking agents according to the present invention produce foams which better maintain their insulating characteristics relative to foams made without these hydrogen bond forming agents.

Thus, the present invention provides in a closed cell thermoplastic or thermoset polymer foam characterized by a continuous polymeric phase and a discontinuous gaseous phase, the improvement comprising: (a) a gaseous phase comprising at least one hydrogen-containing halocarbon; and (b) an effective amount of a hydrogen bond forming blocking agent. Preferably the hydrogen bond forming blocking agent is an organic ether, ester or ketone and is preferably present in the range of from about 0.1 to about 20 weight percent based on the total weight of foam.

Since the blocking agent according to the present invention can often be conveniently incorporated, marketed and used in combination with the blowing agent, the present invention further provides an improved thermoplastic or thermoset polymer foaming composition comprising:

(a) a hydrogen-containing halocarbon; and
(b) an effective amount of a hydrogen bond forming blocking agent.

The improved method according to the present invention involves, in a method of manufacturing an expanded polymeric foam wherein a blowing agent expands as the polymeric phase solidifies, the specific improvement comprising the steps of:

(a) selecting a hydrogen-containing halocarbon as the blowing agent; and
(b) adding an effective amount a hydrogen bond forming blocking agent to reduce the permeation of air into the foam or slow down the escape of blowing agent from of the foam.

It is an object of the present invention to provide a blocking agent that when incorporated into a polymeric foam will reduce or prevent the intrusion of air into the foam and/or the permeation or escape of blowing agent from the foam. It is a further object of the present invention to provide such a blocking agent that is particularly useful with the hydrogen-containing chlorofluorocarbons and hydrogen-containing fluorocarbons (i.e., the HCFCs and HFCs) in that the blocking agent will hydrogen bond with the hydrohalomethanes and hydrohaloethanes, thus significantly reducing their rate of permeation and escape from a closed cell polymeric foam. It is an associated object of the present invention to provide insulating foam containing a blocking agent and a method of manufacturing the same that exhibits preservation of the insulating properties over longer periods of times relative to the absence of the blocking agent. Fulfillment of these objects and the presence and fulfillment of additional objects will be apparent upon complete reading of the specification and the claims.

DESCRIPTION OF THE PREFERRED EMBODIMENTS

Polymer foams typically involve a continuous or at least a contiguous phase in a cellular structure. This cellular structure can be either flexible or rigid and is categorically either an open cell structure (i.e., the individual cells are ruptured or open producing a soft, porous "sponge" foam which contains no blowing agent gas) or a closed cell structure (i.e., the individual cells contain blowing agent gas surrounded by polymeric sidewalls with minimum cell-to-cell gas flow). Thermally insulating foams are closed cell structures containing a blowing agent gas (i.e., a gas formed in situ during the foam manufacturing process). Preferably the blowing agent gas should have a low vapor thermal conductivity (VTC) so as to minimize conduction of heat through the insulating foam. Thus, the vapor thermal conductivities for halocarbons such as CFC-11, CFC-12 and hydrochlorodifluoromethane, $CHClF_2$ (HCFC-22), at 25° C. (i.e., 45.1, 55.7 and 65.9 $Btu.ft^{-1}.hr^{-1}.°F.^{-1} \times 10^4$, respectively) compare favorably to the VTC for air at 25° C. (i.e., 150.5 $Btu.ft^{-1}.hr^{-1}.°F.^{-1} \times 10^4$). From these data, it can readily be seen that the presence of a halocarbon blowing agent is required for optimum thermal insulation properties with both thermoplastic and thermoset foams.

A problem with hydrogen-containing alternative blowing agent HCFC-22 is its rapid migration from thermoplastic foams. For example, in the case of one grade of polystyrene, the permeation rate at 25° C. for CFC-12 vs. HCFC-22 was $4.2 \times 10^{-9}$ g/hr vs. $6.5 \times 10^{-8}$ g/hr (i.e., HCFC-22 diffused 15.5 times faster than CFC-12). Without some way to prevent or slow down the rate of HCFC-22 permeation from polystyrene foam, this blowing agent is unacceptable for producing good insulation foam, using this particular grade of polystyrene.

HCFC-22 is also known to diffuse rapidly from some polyurethane/polyisocyanurate foam formulations. Techniques for slowing/preventing this blowing agent migration are required if the halocarbon is to be useful in preparing these thermoset insulating foams.

In addition to the undesirable degradation of foam insulation value caused by permeation losses of blowing agent, the effect of air entry from the atmosphere into the foam cells is at least equally significant. As air enters the foam cells, the vapor thermal conductivity of the cell gas increases and the insulation value drops.

The blocking agents of this invention unexpectedly function to reduce air entry into foams and/or to reduce the permeation of hydrogen-containing blowing agents such as HCFC-22 from the foam cells, thereby producing more effective/economical insulation foams.

For the purposes of the present invention, the term "blocking agent" is used herein to denote hydrogen bond forming compounds which contain ether, ester or ketone groups or the like. These hydrogen bond forming compounds can bond or associate with hydrogen-containing halocarbon blowing agents such as HCFC-22 and thereby reduce their rates of permeation from the foam.

Unexpectedly, HCFC-22, difluoromethane ($CH_2F_2$, HFC-32), 1,1,1-trifluoro-2,2-dichloroethane ($CHCl_2CF_3$, HCFC-123), 1,1,2-trifluoro-1,2-dichloroethane ($CHClFCClF_2$, HCFC-123a), 1,1,1,2-tetrafluoro-2-chloroethane ($CHClFCF_3$, HCFC-124), pentafluoroethane ($CHF_2CF_3$, HFC-125), 1,1,2,2-tetrafluoroethane ($CHF_2CHF_2$, HFC-134), and 1,1,1,2-tetrafluoroethane ($CH_2FCF_3$, HFC-134a) have been observed to associate or hydrogen bond with compounds containing ether, ester or ketone groups. Glycols and other polyhydroxy compounds tend to form intra- or inter-molecular hydrogen bonds with themselves and thus do not associate strongly with HCFC-22. HCFC-22, with hydrogen bonding esters, ketones or ethers, exhibits dramatically reduced vapor pressure as a result of the association. Furthermore, when these hydrogen bonding compounds are present in thermoplastic polymers such as polystyrene, the permeation of HCFC-22 is reduced/slowed as the result of the mutual association which occurs between these compounds. The hydrogen bond forming agents additionally function to improve the solubility of blowing agents such as HFC-134a in thermoplastic polymers such as polystyrene.

Also, the mutual solubility of HCFC-22 and HCFC-123 or the like with several hydrogen bond forming compounds further provides evidence of an unexpected association between these materials. CFC-12 does not share this unexpected solubility characteristic. Because of the solubility of many of the hydrogen bond forming compounds in HCFC-22, these compounds are suitable for dissolving in HCFC-22 and, thus, can be made commercially available in this convenient form.

For purposes of the present invention and as previously mentioned, the blocking agent can broadly be any compound that contains either an ether, ester or ketone group or combinations of the same and is capable of hydrogen bonding or the equivalent strong association or complexing with hydrogen-containing halocarbons. For example, but not by way of limitation, the following table lists examples of ether, ester or ketone groups containing compounds which associate or hydrogen bond with hydrogen-containing halocarbons such as HCFC-22.

HYDROGEN BONDING AGENTS (1) Polyethylene oxide polymers
(2) Ethylene oxide/propylene oxide copolymers
(3) Polypropylene oxide polymers
(4) Polyethylene glycol mono- and dioleates
(5) Polyethylene glycol monostearates
(6) Alkylphenoxy polyethoxy ethanols
(7) Polyethylene oxide sorbitan monostearates and tristearates
(8) Polyethylene oxide fatty acid amides
(9) Primary and secondary alcohol ethoxylates
(10) Glyme, diglyme, triglyme and tetraglyme
(11) Mono-, di- and tripropylene glycol methyl ethers and ether acetates
(12) Dimethyl adipate, succinate and glutarate
(13) Ethylene oxide/propylene oxide adducts with a sucrose
(14) Ketones and polyketone polymers.

The use of hydrogen-containing blowing agents such as HCFC-22 with ether, ester or ketone hydrogen bond forming compounds in polymer foams does not preclude the simultaneous incorporation of blowing agents such as 1,1-dichloro-1-fluoroethane ($CCl_2FCH_3$, HCFC-141b), 1-chloro-1,1-difluoroethane ($CClF_2CH_3$, HCFC-142b), 1,1,1-trifluoroethane ($CF_3CH_3$, HFC-143a), 1,2-difluoroethane ($CH_2FCH_2F$, HFC-152), and 1,1,-difluoroethane ($CHF_2CH_3$, HFC-152a) which do not tend to form strong hydrogen bonds. It should be further appreciated that various CFCs may also be present as a component of a blowing agent mixture useful according to the present invention and that the present invention is applicable when $CO_2$, hydrocarbons or methyl formate are components of the blowing agent gas. Similarly, various additives such as stabilizers, dyes, fillers, and the like can be present in the blowing agent.

In addition to reducing the entry of air into and/or the migration of hydrogen-containing blowing agents such as HCFC-22 from thermoplastic foams, the hydrogen bond forming agents may provide other functions to the foam manufacturing process. For example, compounds such as the polyethylene oxide polymers may provide lubricity and thereby increase the extrusion throughput or production rate. Furthermore, these compounds are contemplated as potentially useful as polymer plasticizers and may contribute advantageously to other properties.

The hydrogen bond forming agents of this invention are suitable for use with thermoplastics such as polystyrene, polyethylene, polypropylene, polyvinyl chloride, and the like to prevent loss of hydrogen-containing blowing agents; however, they can also be used with thermoset polymer foams such as polyurethane, polyisocyanurate, and phenolic resin foams. Since these hydrogen bond forming agents associate with blowing agents such as HCFC-22, they will function to reduce/prevent permeation of the blowing agent in any compatible polymer foam system. Furthermore, these hydrogen bond forming agents will function in the presence of other additives normally used in polymer foams, such as stabilizers, dyes, fillers, and the like.

The blowing agent concentration used to prepare most conventional thermoplastic and thermoset polymer foams is generally in the range of about 5 weight percent to about 30 weight percent (based on total weight of the foam). To reduce migration of hydrogen-containing blowing agents such as HCFC-22, the effective use concentration of hydrogen bond forming agent is at least about 0.1 weight percent and preferably from about 1.0 to 20 weight percent (based on total formulation weight), most preferably about 0.5 weight percent to about 10 weight percent. Typically, the improved polymer foaming composition will contain from 1 to 100 parts by weight hydrogen bond forming blocking agent for every 100 parts of hydrogen-containing halocarbon blowing agent.

The actual method by which the blocking agent according to the present invention is to be incorporated into the closed cell foam can vary according to the specific application and composition being employed. In the broadest sense, the blocking agent can be treated as any other foam additive as generally known in the art. As previously stated, the blocking agent in certain applications imparts beneficial effects to the polymer phase in addition to reducing permeability and in such cases the blocking agent can be added to the polymer. Since the blocking agent is categorically a hydrogen bond forming compound, it may be advantageously added to the blowing agent or preblended into the polymer (e.g., polystyrene) prior to extrusion or other method of fabrication. In the case of thermoset foams (e.g., polyurethane/polyisocyanurate foams) the hydrogen bond forming agents can be added to the foam in the isocyanate (A-side) or the polyol (B-side) or added with the blowing agent at the mixing head where the A-side and B-side are combined (i.e., third-streamed). For purposes of the present invention the term "A-side" is used to specify the isocyanate containing component of a conventional two component precursor foam system. The term "B-side" is used to specify the polyol containing component. It should be appreciated that this nomenclature may be reversed particularly in certain European literature. It should be further appreciated that these precursor components to foams typically contain other ingredients, additives, agents, diluent and the like all as generally known in the art. Thus for example, but not by way of limitation, the B-side will typically contain, in addition to the polyol, a surfactant, a catalyst and one or more blowing agents. If the hydrogen bond forming agent used contains free hydroxyl groups, this must be taken into account when calculating the hydroxyl equivalent for the B-side system. In the case where the blocking agent is preferentially more soluble in one of the foam components, it is preferably added to that component. For example, addition of the blocking agent to the polyol component of two-component thermoset resin is preferred. Of course, the addition to more than one component or either component is also contemplated. In the case of phenolic foams, the hydrogen bond forming agents can be added to the foam by preblending into the resole or added separately at the mixing head prior to the foam laydown. The most preferred method of adding the blocking agent is to mix it with the blowing agent and as such the admixture of HCFC or HFC and blocking agent is contemplated as being a commercially attractive product, per se. Again, since the blocking agent is categorically a hydrogen bond forming compound, in the case of the thermoset foams (e.g., polyurethane/polyisocyanurate foams) not only can a polyol be added as the blocking agent but the polyol (B-side) can be viewed as the blocking agent. Thus, as previously stated if the hydrogen bond forming agent used contains free hydroxyl groups they must be taken into account when calculating the hydroxyl equivalent for the B-side system. Conversely, the ether and ester groups of the polyol found in the B-side should also be view as contributing as the hydrogen bond forming blocking agent. As such, in cases where there are ether and/or ester groups present in the polyol, the polyol should be considered as a blocking agent.

The following examples are presented to further illustrate specific critical properties of various specific embodiments of the present invention, including vapor pressure, boiling point and permeation data, as well as similar properties, for comparison purposes, of systems and compositions outside the scope of the invention.

EXAMPLE 1

The solubilities of several representative hydrogen bond forming agents in HCFC-22 were determined for 10 wt % solutions at ambient temperature (approximately 70° F.). The solutions were prepared by combining the hydrogen bond forming agents with HCFC-22 in 4 oz. plastic-coated pressure bottles. Solubility was determined by visual examination. Table I lists ten hydrogen bond forming compounds which are soluble to >10 wt. % in HCFC-22. These hydrogen bond forming agents are soluble in HCFC-22, HCFC-123 and HCFC-123a because of their bonding or association; whereas, they are generally insoluble in CFC-12. The hydrogen bond forming agents are also soluble in HCFC-141b.

Table I

Hydrogen Bonding Agent Solubility in HCFC-22

The following hydrogen bonding agents are soluble at ambient temperature in HCFC-22 to >10 wt. %.:

Hydrogen Bonding Agents*

"PLURONIC" F-108

"CARBOWAX" 3350
"WITCONOL" H35A
"TRITON" X-67
Polypropylene Glycol 2025
"ETHOFAT" O/20
"ETHOMID" HT/60
"TERGITOL" 15-S-20
"ETHOX" DO-9
"TERGITOL" NP-40

* Solubilities determined at ambient temperature (approximately. 70° F.). Similar solubilities have been observed for HCFC-123, HCFC-123a, and HCFC-141b even though HCFC-141b is not a strong hydrogen bond forming HCFC.

EXAMPLE 2

Vapor pressure data were obtained for mixtures of CFC-12 and HCFC-22, respectively, with hydrogen bonding agents. In these tests, 30 grams of blowing agent was combined with 70 grams of hydrogen bond forming agent in a 4 oz. plastic-coated pressure bottles. After thermostatting the bottles at 70° F., the vapor pressures were determined using a pressure gauge accurate to 0.1 psi. Although HCFC-22 by itself has considerably higher vapor pressure at 70° F. than CFC-12 (121.4 psig vs. 70.2 psig), the formation of hydrogen bonds between the hydrogen bond forming agents and HCFC-22 resulted in dramatic vapor pressure depressions to values much lower than for CFC-12. The vapor pressure data are summarized in Table II.

Boiling point data were obtained for a 30/70 blend of HCFC-123/DBE. The data in Table IIA show an elevation in boiling point (relative to the value calculated from Raoult's Law) of 17° C. as the result of the association or hydrogen bonding which occurs between these materials. Similar boiling point elevations were observed for 30/70 blends of HCFC-123/DPM and HCFC-123/DPMA.

Table IIB shows vapor pressure data for HFC-32, HCFC-124, HFC-125, HFC-134 and HFC-134a with DBE, acetone, and 2-pentanone. Each hydrogen bond forming agent depresses the vapor pressure of the blowing agents.

TABLE II

Effect of Hydrogen Bonding Agents on Vapor Pressure of HCFC-22

| Bonding Agent | Blowing Agent Wt. % | Vapor Pressure at 70° F., psig CFC-12 | HCFC-22 |
|---|---|---|---|
| None | 100.0 | 70.2 | 121.4 |
| "CARBOWAX" 3350 | 30.0 | 70.2 | 57.2 |
| "PLURONIC" F-108 | 30.0 | 70.2 | 55.5 |
| "WITCONOL" H35A | 15.0 | 44.0 | 20.0 |
|  | 30.0 | 70.2 | 38.0(*) |
| "TRITON" X-67 | 15.0 | 70.2 | 29.5 |
|  | 30.0 | 70.2 | 41.0 |
| "TWEEN" 61 | 30.0 | 70.2 | 70.5 |
| Polypropylene Glycol 2025 | 30.0 | 49.2(*) | 39.3(*) |
| "ETHOFAT" 0/20 | 30.0 | 57.5(*) | 35.0(*) |
| "ETHOMID" HT/60 | 15.0 | 70.2 | 18.5 |
|  | 30.0 | 70.2 | 29.0 |
| "CARBOWAX" 8000 | 30.0 | 70.2 | 61.0 |
| Polyethylene Glycol Cpd 20M | 30.0 | 70.2 | 55.2 |
| "POLYOX" WSRN-10 | 30.0 | 70.2 | 56.5 |
| "TERGITOL" 15-S-20 | 15.0 | 70.2 | 15.0 |
|  | 30.0 | 70.2 | 26.5(*) |
| "TERGITOL" 24-L-92 | 30.0 | 59.2(*) | 31.0(*) |
| "TERGITOL" NP-40 | 30.0 | 70.2 | 44.0 |
| Polypropylene Glycol 425 | 30.0 | 54.0(*) (112.5 at 130° F.) | 37.0(*) (93.0 at 130° F.) |
| "PLURACOL" 975 | 15.0 | 46.0(*) (110.0 at 130° F.) | 17.0(*) (49.0 at 130° F.) |
|  | 30.0 | 70.2 (2 phases) | 50.5(*) |
| "ETHOX" DO-9 | 30.0 | 53.7(*) | 39.5(*) |
| Diglyme | 30.0 | 26.0(*) | 7.0(*) |
| Glyme | 30.0 | 16.0 | 2.5(*) |
| DBE | 30.0 | 45.0(*) | 21.5(*) |
| "ARCOSOLV" PM | 30.0 | 35.0(*) | 19.5(*) |
| Acetone | 30.0 | 19.5(*) | 5.9(*) |
| 2-Pentanone | 30.0 | 40.5(*) | 14.5(*) |
| Polymethylvinyl Ketone | 30.0 | 61.0(*) | 45.5(*) |

(* solution)

TABLE IIA

Boiling Point Elevation Data

| Compound | Boiling Point, °C. Actual | Raoult's Law |
|---|---|---|
| HCFC-123* | 27.6 | — |
| DBE | 196 | — |
| 30/70 HCFC-123*/DBE | 81 | 64 |
| DPM | 188 | — |
| 30/70 HCFC-123*/DPM | 88 | 67 |
| DPMA | 200 | — |
| 30/70 HCFC-123*/DPMA | 93 | 60 |

*Commercial grade; typically including up to about 10 percent HCFC-123a.

TABLE IIB

Effect of Hydrogen Bonding Agents on Vapor Pressures of HCFC-124, HFC-125, HFC-134, HFC-134a and HFC-32

| Bonding Agent | Blowing Agent | Blowing Agent Wt. % | Vapor Pressures at 70° F., psig |
|---|---|---|---|
| None | CFC-114 | 100.0 | 12.9 |
| DBE | CFC-114 | 30.0 | 12.7 (*) |
| None | HCFC-124 | 100.0 | 34.1 |
| DBE | HCFC-124 | 30.0 | 1.2 (*) |
| Acetone | HCFC-124 | 30.0 | 0 (*) |
| 2-Pentanone | HCFC-124 | 30.0 | 1.8 (*) |
| None | HFC-125 | 100.0 | 163.8 |
| DBE | HFC-125 | 30.0 | 35.0 (*) |
| Acetone | HFC-125 | 30.0 | 10.0 (*) |
| None | HFC-134a | 100.0 | 81.3 |
| DBE | HFC-134a | 30.0 | 15.3 (*) |
| Acetone | HFC-134a | 30.0 | 3.5 (*) |
| 2-Pentanone | HFC-134a | 30.0 | 12.0 (*) |
| None | HFC-134 | 100.0 | 60.2 |
| DBE | HFC-134 | 30.0 | 7.0 (*) |
| Acetone | HFC-134 | 30.0 | 0 (*) |
| None | HFC-32 | 100.0 | 206.3 |
| Acetone | HFC-32 | 30.0 | 41.0 (*) |

(* solution)

EXAMPLE 3

For comparison purposes, HCFC-22 was combined with non-hydrogen bonding agents, such as stearyl stearamide ("KEMAMIDE" S-180) and glycerol monostearate ("WITCONOL" MST), and the vapor pressure of HCFC-22 showed slight, if any, depression. Thus, compounds which form strong hydrogen bonds with themselves, e.g., glycerol monostearate, do not associate with HCFC-22 and do not reduce the measured vapor pressure. The vapor pressure data are shown in Table III.

TABLE III

Vapor Pressure for HCFC-22 with Non-Hydrogen Bonding Agents

| Additive | Blowing Agent Wt. % | Vapor Pressure at 70° F., psig CFC-12 | HCFC-22 |
|---|---|---|---|
| None | 100.0 | 70.2 | 121.4 |
| "KEMAMIDE" S-180 | 30.0 | 70.2 | 121.4 |
| "WITCONOL" MST | 30.0 | 70.2 | 118.0 |
| "ALKAMIDE" HTDE | 30.0 | 70.2 | 105.0 |
| "ARMID" O | 30.0 | 70.2 | 118.0 |
| "SPAN" 60 | 30.0 | 70.2 | 108.5 |
| Glycerin | 30.0 | 70.2 | 121.4 |
| "SELAR" OH 3007 | 30.0 | 70.2 | 121.4 |
| "SELAR" PA 7426 | 30.0 | 70.2 | 121.4 |
| "SURLYN" 8396-2 | 30.0 | 70.2 | 121.4 |
| Polyacrylonitrile A-7 | 30.0 | 70.2 | 120.8 |
| "SOLEF" 1008-1001 | 30.0 | 70.2 | 121.4 |
| "ELVANOL" 90-50 | 30.0 | 70.2 | 121.4 |

EXAMPLE 4

The permeation of nitrogen and HCFC-22 through polystyrene film was measured for polymer films with and without blocking agents.

The permeation data was obtained on 15-20 mil thick polystyrene films which were prepared as follows:
(a) Hydrogen bond forming agents and polystyrene were passed through a twin screw extruder three times at 400° F. to ensure good blending of components. The extruder used was a 28 mm Werner and Pfleider, Stuttgart, Model 20S-K-28 twin screw.
(b) After pelletizing the extruded polymer, 15-20 mil thick films (in 6"×6" sheets) were pressed at about 35,000 psig pressure using a Barber-Coleman press.
(c) The 6"×6" sheets of 15-20 mil film were cut into 47 mm diameter circles or discs with a polymer die punch.

Permeation tests were run on polystyrene films containing various blocking agents to determine the permeation of air and blowing agents in polystyrene foam. Such film closely simulates polystyrene foam cell walls and the permeation data are predictive of foam blowing agent retention and susceptibility to air intrusion. Studies were made with HCFC-22 and nitrogen (simulating air).

Polystyrene Film Preparation (A) Mixing Polystyrene/Additives by Extrusion

Samples of polystyrene (2500 grams) plus blocking agents were hand mixed and passed through a screw extruder three times at about 400° F. Three passes were used to ensure uniform blending of components. Since the polymer mixes were extruded into a water tank for cooling prior to pelletizing (between the passes through the extruder and after the third extrusion), the pelletized samples were dried about 16 hours in a vacuum oven at 175°–200° F. The extruder used was a 28 mm Werner and Pfleider, Stuttgart, Model 20S-K-28 twin screw.

(B) Film Pressing of Polystyrene/Additive Mixtures

Using a Barber-Coleman press, 30 gram samples of polystyrene/additive mixes (as pellets) were pressed into 6"×6" sheets of film with 15–20 mil thickness. The pressing was done at 400° F. and at a pressure of about 35,000 psig (maintained for 5 minutes).

(C) Film Discs for Permeation Tests

Discs (15–20 mil thickness) were cut from 6"×6" sheets of film. Five discs of 47 mm diameter were made from each sheet. The discs were cut or stamped at ambient temperature using a die punch made of A-2 type steel (hardened).

Permeation Test Procedure

The permeation tests on the polystyrene film containing blocking agents were conducted by a modification of ASTM D1434-82, "Standard Method for Determining Gas Permeability Characteristics of Plastic Film and Sheeting". This modified procedure is described in the Master of Chemical Engineering Thesis, P. S. Mukherjee, Widener University, Chester, Pa., February 1988, entitled "A Study of the Diffusion and Permeation Characteristics of Fluorocarbons Through Polymer Films".

Test Conditions (1) All tests were run at a 20 psia pressure differential between the high pressure side and the low pressure side of the permeation cell.
(2) Permeation tests were run at 60° to 120° C., with tests for each blocking agent/polystyrene/gas combination being run at two or more temperatures. Data for other temperatures were calculate from the equation:

$$\ln P = \frac{A}{T} + B$$

where P is permeation coefficient, T is °K. (°C.+273.2) and A and B are constants determined from the permeation coefficients calculated from the following equation:

$$P = \frac{(\text{Rate of Permeation})(\text{Film Thickness})}{(\text{Film Area})(\text{Pressure drop across film})}$$

(3) The permeation rates are based on a 1 cm² by 1 cm thick film with a 1.0 psia pressure drop across the film.

The permeation rate and permeation coefficient data for nitrogen in polystyrene containing blocking agents are summarized in Table IV. Data for HCFC-22 in polystyrene containing blocking agents are shown in Table V. The units for permeation rate are g/hr and for permeation coefficient are cm³(STP).cm/sec-cm².cmHg. The data summarized in Tables IV and V are calculated at 25° C. from data measured at other temperatures.

TABLE IV

Permeation Data
Polymer: Polystyrene* Temperature: 25° C.

| Gas | Blocking Agent | Wt. % in Polymer | Permeation Coeff. cm³ gas at STP cm sec cm² (cm Hg) | Permeation Rate g/hr | % Change In Permeation Rate |
|---|---|---|---|---|---|
| Nitrogen | None | — | $8.00 \times 10^{-11}$ | $1.86 \times 10^{-9}$ | — |
| Nitrogen | "WITCONOL" H35A | 5.0 | $5.50 \times 10^{-11}$ | $1.28 \times 10^{-9}$ | −31.2 |
| Nitrogen | "TRITON" X-67 | 5.0 | $4.49 \times 10^{-11}$ | $1.04 \times 10^{-9}$ | −44.1 |
| Nitrogen | Polypropylene Glycol 2025 | 5.0 | $4.72 \times 10^{-11}$ | $1.10 \times 10^{-9}$ | −40.9 |
| Nitrogen | "TWEEN" 61 | 5.0 | $4.672 \times 10^{-11}$ | $1.07 \times 10^{-9}$ | −42.5 |

*"DYLENE" 8 polystyrene (Melt Index 6–7), Arco Chemical Company.

TABLE V

Permeation Data
Polymer: Polystyrene* Temperature: 25° C.

| Gas | Blocking Agent | Wt. % in Polymer | Permeation Coefficient cm³ gas at STP cm sec cm² (cm Hg) | Permeation Rate g/hr | % Change In Permeation Rate |
|---|---|---|---|---|---|
| HCFC-22 | None | — | $5.41 \times 10^{-12}$ | $3.89 \times 10^{-10}$ | — |
| HCFC-22 | "WITCONOL" H35A | 5.0 | $2.21 \times 10^{-12}$ | $1.58 \times 10^{-10}$ | −59.4 |

*"DYLENE" 8 polystyrene (Melt Index 6–7), Arco Chemical Company.

Example 5

In a manner analogous to Example 2, vapor pressure data were obtained for mixtures of HCFC-22 in polyols and for a mixture of HFC-134a in a polyol. The vapor pressure data are summarized in Table VI.

TABLE VI

Effect of Polyols as Hydrogen Bonding Agents on Vapor Pressure of HCFC-22 and HFC-134a

| Hydrogen Hydrogen Bonding | Wt. % | FOUND HCFC-22* | RAOULT'S LAW |
|---|---|---|---|
| STEPANPOL PS-2502 | 2.9 | 0 | 15.2 |
| | 5.4 | 13.5 | 27.7 |
| | 7.8 | 17.0 | 37.0 |
| | 17.9 | 43.5 | 64.5 |
| | 20.6 | 64.0 | 68.0 |
| PLURACOL P-410 | 2.0 | 0 | 11.0 |
| | 4.0 | 0 | 20.6 |
| | 6.0 | 3.0 | 29.0 |
| | 8.0 | 6.5 | 36.3 |
| | 10.0 | 9.0 | 42.9 |
| | 12.0 | 10.6 | 48.9 |
| PLURACOL TP-440 | 2.1 | 4.3 | 11.6 |
| | 4.0 | 7.8 | 20.6 |
| | 6.4 | 12.0 | 30.5 |
| | 9.9 | 18.5 | 42.6 |
| | 12.0 | 24.2 | 48.9 |
| PLURACOL 1016 | 1.8 | 0.8 | 7.3 |
| | 4.0 | 4.8 | 15.3 |
| | 6.0 | 8.0 | 22.0 |
| | 8.2 | 15.0 | 28.7 |
| | 10.1 | 17.0 | 33.2 |
| | 12.1 | 20.5 | 39.2 |

| Blocking Agent Bonding Agent | Wt. % | FOUND HCFC-134A* | RAOULT'S LAW |
|---|---|---|---|
| PLURACOL PT-440 | 2.5 | 0 | 6.8 |
| | 5.0 | 4.0 | 12.7 |
| | 7.6 | 12.0 | 18.1 |

TABLE VI-continued

Effect of Polyols as Hydrogen Bonding Agents on Vapor Pressure of HCFC-22 and HFC-134a

| Blowing Agent | Vapor Pressure at 70° F., psig | |
|---|---|---|
| 10.0 | 19.0 | 22.4 |

*wt % blowing agent in hydrogen bonding agent

Example 6

To further verify the differences in behavior between the conventional chlorofluorocarbon blowing agents and the hydrogen-containing halocarbons, the solubility of HCFC-134a was compared to that of CFC-12. The CFC-12 was found to be miscible at 25° C. in 150 SUS (32 cs at 100° F.) oils including paraffinic oils, naphthenic oils, alkylated benzene oils and PAG* oils. In contrast, the HFC-134a was found to be insoluble (<1 wt. percent) in the paraffinic oils, naphthenic oils and alkylated benzene oils. However, HFC-134a was found to be miscible in PAG oils at 25° C.

* UCON oils (n-butyl alcohol+propylene oxide or EO/PO)

Example 7

Closed cell polyurethane thermoset foams were produced using CFC-11, HCFC-22 and HFC-134a as the primary blowing agent and $CO_2$ produced in situ by addition of water. The K-factor for the respective foams were measured and compared to vapor thermal conductivity data corresponding to the blowing agents. The respective recipe for both the A-side and the B-Side components and the resulting data are presented in Table VII along with the vapor thermal conductivity data.

TABLE VII

| Foams co-blown with water: | | |
|---|---|---|
| A-Side | 270 gms | PAPI 580 |
| B-Side | 100 gms | STEPAPNOL PS-2502 |
| | 2.3 gms | DC 193 |
| | 5 gms | HEXCEM 977 |
| | .35 gms | POLYCAT 8 |
| | 2.5 gms | water |
| | (see below) | halocarbon |

Foam Index** 250

| Blowing Agent type | gms | B-Side vap. pres. psig | Volume of gas MOLES B.A. | CO$_2$ | total | Density lbs/ft$^3$ | K-factor* age in days @ R. 5 | 6 |
|---|---|---|---|---|---|---|---|---|
| CFC-11 | 12 | 0 | 0.09 | 0.14 | 0.23 | 3.42 | 0.171 | |
| CFC-11 | 22 | 0 | 0.16 | 0.14 | 0.30 | 3.24 | 0.162 | |
| CFC-11 | 32.6 | 0 | 0.24 | 0.14 | 0.38 | 3.31 | 0.151 | |
| HCFC-22 | 12 | 33 | 0.14 | 0.14 | 0.28 | 2.96 | 0.162 | |
| HFC-134a | 12 | 28 | 0.12 | 0.14 | 0.26 | 2.97 | | 0.172 |

| Foams blown without water: | | |
|---|---|---|
| A-Side | 158 gms | PAPI 580 |
| B-Side | 100 gms | STEPANPOL PS-2502 |
| | 1.7 gms | DC 193 |
| | 1.35 gms | HEXCEM 977 |
| | .17 gms | POLYCAT 8 |
| | 0.0 gms | water |
| | (see below) | halocarbon |

Foam Index** 250

| Blowing Agent type | gms | B-Side vap. pres. psig | Volume of gas MOLES B.A. | CO$_2$ | total | Density lbs/ft$^3$ | K-factor* age in days @ R. 10 |
|---|---|---|---|---|---|---|---|
| CFC-11 | 41 | 0 | 0.30 | 0.00 | 0.30 | 2.5 | 0.143 |
| HCFC-22 | 26 | 0 | 0.30 | 0.00 | 0.30 | 2.8 | 0.162 |

| VAPOR THERMAL CONDUCTIVITY DATA VTC, Btu/hr · ft · °F. | | |
|---|---|---|
| BLOWING AGENT | 25° C. | 60° C. |

TABLE VII-continued

| | | |
|---|---|---|
| CFC-11 | 0.00451 | 0.00530 |
| CFC-22 | 0.00660 | 0.00748 |
| HFC-134a | 0.00838 | 0.01020 |
| $CO_2$ | 0.00953 | 0.01107 |

*(Btu · in/hr · ft² · °F.)
**(equivalents of isocyanate/equivalents of hydroxyl) × 100

The primary property of halocarbon blowing agents in insulating foam is to provide good thermal insulation by virtue of their low vapor thermal conductivity in the foam cells. By comparing the accompanying vapor thermal conductivity data (VTC) for CFC-11, and HFC-134a or CFC-22, it is apparent that conductivity of HFC-134a and CFC-22 is almost twice that of CFC-11. Thus it is to be expected that an insulating foam made with HFC-134a or CFC-22 would be a much poorer insulator than a foam made with CFC-11. On the contrary and as seen in the k-factor data, the insulation performance for the HFC-134a/$CO_2$ and CFC-22/$CO_2$ foam is unexpectedly and essentially the same as that for the CFC-11/$CO_2$ foam, wherein the HCFC-134a/$CO_2$ and CFC-22/$CO_2$ foam produced in the presence of the blocking agent exhibited extremely fine closed cell structure.

The chemicals used in the Previous Examples and tests are identified structurally and by source as follows:

| Designation | Structure | Source |
|---|---|---|
| "CARBOWAX" 3350 | Polyethylene glycol | Union Carbide Corp. |
| "CARBOWAX" 8000 | Polyethylene glycol | Union Carbide Corp. |
| "Pluronic" F-108 | Ethylene oxide/propylene oxide copolymer | BASF Wyandotte Corp. |
| "WITCONOL" H35A | Polyethylene glycol (400) stearate | Witco Corp. |
| "WITCONOL" MST | Glycerol monostearate | Witco Corp. |
| "TRITON" X-67 | Alkylpolyethoxy ethanol | Rohm and Haas Co. |
| "TWEEN" 61 | POE (4) sorbitan stearate | ICI Americas, Inc. |
| Polypropylene Glycol 2025 | Polypropylene glycol | Union Carbide Corp. |
| "ETHOFAT" 0/20 | Polyethylene oxide oleate | Akzo Chemie America |
| "ETHOMID" HT/60 | Polyethylene oxide fatty acid amide | Akzo Chemie America |
| Polyethylene Glycol Cpd 20M | Polyethylene glycol | Union Carbide Corp. |
| "POLYOX" WSRN-10 | Polyethylene oxide | Union Carbide Corp. |
| "TERGITOL" 15-S-20 | Linear alcohol/ethylene oxide | Union Carbide Corp. |
| "TERGITOL" 24-L-92 | Linear alcohol/ethylene oxide | Union Carbide Corp. |
| "TERGITOL" NP-40 | Nonylphenol/ethylene oxide | Union Carbide Corp. |
| Polypropylene Glycol 425 | Polypropylene glycol | Union Carbide Corp. |
| "PLURACOL" 975 | Sucrose polyol | BASF Wyandotte Corp. |
| "PLURACOL" P-410 | Polypropylene glycol | BASF Wyandotte Corp. |
| "PLURACOL" P-440 | Trifunctional polyol based upon Polypropylene glycol | BASF Wyandotte Corp. |
| "PLURACOL" 1016 | Trifunctional | BASF Wyandotte Corp. |
| "STEPANPOL" PS-2502 | amino polyol Defunctional polyol based upon Phthalic anhydride | Stepan Company |
| "PAPI" 580 | Methylene diisocyanate | DOW Chemicals |
| "DC" 193 | Silicone surfactant | DOW Chemicals |
| "HEXCEM" 977 | Potassium octanoate | Mooney Chemicals |
| "POLYCAT" 8 | N,N-dimethylcyclohexyamine | Air Products and Chemicals, Inc. |
| "ETHOX" DO-9 | Polyethylene glycol dioleate | Ethox Chemicals Inc. |
| Glyme | Ethylene glycol di-methylether | Aldrich Chemical Co. |
| Diglyme | 2-Methoxy-ethyl ether | Aldrich Chemical Co. |
| DBE | Mixture of dimethyl adipate, dimethyl glutarate and dimethyl succinate* | Du Pont Co. |
| "ARCOSOLV" PM | Propylene glycol mono-ethyl ether | Arco Chemical Co. |
| "ARCOSOLV" DPM | Dipropylene glycol mono-methyl ether | Arco Chemical Co. |
| "ARCOSOLV" DPMA | Dipropylene glycol mono-methyl ether acetate | Arco Chemical Co. |
| "KEMAMIDE" S-180 | Stearyl stearamide | Witco Corp. |
| Acetone | — | Fisher Scientific |
| 2-Pentanone | Methyl propyl ketone | Pfaltz and Bauer, Inc. |
| "ALKAMIDE" HTDE | stearic diethanolamide | Alkaril Chemicals, Ltd |
| "ARMID" O | Oleamide | Akzo Chemie America |
| "SPAN" 60 | Sorbitan stearate | ICI Americas, Inc. |
| Glycerin | — | Aldrich Chemical Co. |
| "SELAR" OH 3007 | Ethylene/vinyl alcohol copolymer | Du Pont Co. |
| "SELAR" PA 7426 | Amorphous nylon | Du Pont Co. |
| "SURLYN" 8396-2 | Ethylene/methacrylic acid copolymer | Du Pont Co. |
| Polymeric Acrylonitrile A-7 | Acrylonitrile/methyl acrylate copolymer | Du Pont CO. |
| "SOLEF" 1008-1001 | Polyvinylidene fluoride | Soltex Polymer Corp. |
| "ELVANOL" 90-50 | Polyvinyl alcohol | Du Pont Co. |
| "DYLENE" 8 | Polystyrene | Arco Chemical Co. |
| Polymethylvinyl Ketone (8919) | — | Monomer-Polymer Laboratories, Inc. |
| CFC-12 | Dichlorodifluoromethane | Du Pont Co. |
| CFC-114 | 1,2-dichlorotetrafluoroethane | Du Pont Co. |

-continued

| Designation | Structure | Source |
| --- | --- | --- |
| HCFC-22 | Chlorodifluoromethane | Du Pont Co. |
| HCFC-123 | 1,1,1-trifluoro-2,2-dichloroethane | Du Pont Co. |
| HCFC-123a | 1,1,2-trifluoro-1,2-dichloroethane | Du Pont Co. |
| HCFC-124 | 1,1,1,2-tetrafluorochloroethane | Du Pont Co. |
| HFC-125 | Pentafluoroethane | Du Pont Co. |
| HFC-32 | Difluoromethane | Du Pont Co. |
| HFC-134 | 1,1,2,2-tetrafluoroethane | Du Pont Co. |
| HFC-134a | 1,1,1,2-tetrafluoroethane | Du Pont Co. |
| HCFC-141b | 1-fluoro-1,1-dichloroethane | Du Pont Co. |

*17/66/16.5 mixture of esters

Having thus described and exemplified the invention with a certain degree of specificity, it should be appreciated that the following claims are not to be so limited but are to be afforded a scope commensurate with the wording of each element of the claims and equivalents thereof.

We claim:

1. In a closed cell thermoplastic or thermoset polymer foam insulation characterized by a continuous polymeric phase and a discontinuous gaseous phase, the improvement comprising:
   (a) closed cells which comprise a discontinuous gaseous phase comprising at least one hydrogen-containing halocarbon blowing agent;
   (b) an effective amount of a hydrogen bond forming blocking agent to reduce the permeation of air into the cells wherein said blocking agent comprises ether, ester, or ketone groups, and said ether is a member selected from the group consisting of sucrose polyether polyols, amino polyether polyols, polypropylene glycol polyether polyols, polyethylene glycol polyether polyols, glyme, diglyme, triglyme and tetraglyme; mono-, di- and tripropylene glycol methyl ethers and ether acetates; and mixtures thereof, wherein the blowing agent is a material selected from the group consisting of $CHClF_2$, $CH_2F_2$, $CHCl_2CF_3$, $CHClFCClF_2$, $CHClFCF_3$, $CHF_2CF_3$, $CHF_2CHF_2$, $CH_2FCF_3$ and mixtures thereof; and
   (c) said blowing agent optionally further comprises at least one additional blowing agent.

2. An improved closed cell thermoplastic or thermoset polymer foam of claim 1 wherein said hydrogen bond forming blocking agent is present in the range of at least about 0.1 weight percent of said foam.

3. An improved closed cell thermoplastic or thermoset polymer foam of claim 1 wherein said hydrogen bond forming blocking agent is present in the range of from about 1.0 to about 20 weight percent of said foam.

4. An improved closed cell thermoplastic or thermoset polymer foam of claim 1 wherein said blocking agent is selected from the group consisting of:
   Polyethylene glycol mono- and dioleates;
   Polyethylene glycol monostearates;
   Polyethylene oxide sorbitan monostearates and tristearates;
   Polyethylene oxide fatty acid amides;
   Dimethyl adipate, succinate and glutarate;
   Ketones and polyketone polymers; and mixtures thereof.

5. An improved closed cell thermoplastic or thermoset polymer foam of claim 1 wherein said additional blowing agent gas is selected from the group consisting of:
   $CFCl_3$; $CF_2Cl_2$; $CCl_2FCClF_2$; $CClF_2CClF_2$; $CCl_2FCH_3$; $CClF_2CH_3$; $CH_2FCH_2F$; $CH_3CF_3$; $CHF_2CH_3$; $CO_2$; $C_3$ to $C_6$ hydrocarbons; methyl formate; and mixtures thereof.

6. An improved thermoplastic or thermoset polymer foaming composition comprising:
   (a) a hydrogen-containing halocarbon; and
   (b) an effective amount of a hydrogen bond forming blocking agent to reduce the permeation of air into the foam or slow down the escape of blowing agent from the foam, wherein said blocking agent comprises ether, ester, or ketone groups, and said ether is a member selected from the group consisting of sucrose polyether polyols, aminopolyether polyols, polypropylene glycol polyether polyols, polyethylene glycol polyether polyols, glyme, diglyme, triglyme and tetraglyme, mono-, di- and tripropylene glycol methyl ethers and ether acetates; and mixtures thereof, wherein the blowing agent is a material selected from the group consisting of $CHClF_2$, $CH_2F_2$, $CHCl_2CF_3$, $CHClFCClF_2$, $CHClFCF_3$, $CHF_2CF_3$, $CHF_2CHF_2$, $CH_2FCF_3$ and mixtures thereof, wherein said blowing agent optionally further comprises at least one additional blowing agent.

7. An improved polymer foaming composition of claim 6 wherein for every 100 grams of said hydrogen-containing halocarbon there is from about 1 to about 100 grams of said hydrogen bond forming blocking agent.

8. An improved polymer foaming composition of claim 6 wherein said hydrogen bonding blocking agent is selected from the group consisting of:
   Polyethylene glycol mono- and dioleates;
   Polyethylene glycol monostearates;
   Polyethylene oxide sorbitan monostearates and tristearates;
   Polyethylene oxide fatty acid amides;
   Dimethyl adipate, succinate and glutarate;
   Ketones and polyketone polymers; and mixtures thereof.

9. An improved polymer foaming composition of claim 8 wherein said additional blowing agent gas is selected from the group consisting of:
   $CFCl_3$; $CF_2Cl_2$; $CCl_2FCClF_2$; $CClF_2CClF_2$; $CCl_2FCH_3$; $CClF_2CH_3$; $CH_2FCH_2F$; $CH_3CF_3$; $CHF_2CH_3$; $CO_2$; $C_3$ to $C_6$ hydrocarbons; methyl formate; and mixtures thereof.

10. In a method of manufacturing an expanded closed cell polymeric foam wherein a blowing agent expands as the polymeric phase solidifies, the specific improvement comprising the steps of:
   (a) selecting a hydrogen-containing halocarbon as the blowing agent;
   (b) adding an effective amount of a hydrogen bond forming blocking agent to reduce the permeation of air into or slow down the escape of blowing agent from the closed cells foam; wherein said blocking agent comprises ether, ester, or ketone groups, and said ether is a member selected from the group consisting of sucrose polyether polyols, aminopolyether polyols, polypropylene glycol polyether polyols, polyethylene glycol polyether polyols, glyme, diglyme, triglyme and tetraglyme, mono-, di- and tripropylene glycol methyl ethers and ether acetates; and mixtures thereof, wherein the blowing agent is a material selected from the group consisting of $CHClF_2$, $CH_2F_2$, $CHCl_2CF_3$, $CHClFCClF_2$, $CHClFCF_3$, $CHF_2CF_3$, $CHF_2CHF_2$, $CH_2FCF_3$ and mixtures thereof; and (c) said blowing agent optionally further comprises at least one additional blowing agent.

11. A method of claim 10 wherein said hydrogen bond forming blocking agent is present in the range of from at least about 1.0 weight percent of said foam.

12. A method of claim 10 wherein said hydrogen bond forming blocking agent is present in the range of from about 1.0 to about 20 weight percent of said foam.

13. A method of claim 10 wherein said blocking agent is selected from the group consisting of:
Polyethylene glycol mono- and dioleates
Polyethylene glycol monostearates;
Polyethylene oxide sorbitan monostearates and tristearates;
Polyethylene oxide fatty acid amides;
Dimethyl adipate, succinate and glutarate;
Ketones and polyketone polymers; and mixtures thereof.

14. A method of claim 10 wherein said additional blowing agent gas is selected from the group consisting of:
$CFCl_3$; $CF_2Cl_2$; $CCl_2FCClF_2$; $CClF_2CClF_2$; $CCl_2FCH_3$; $CClF_2CH_3$; $CH_2FCH_2F$; $CH_3CF_3$; $CHF_2CH_3$; $CO_2$; $C_3$ to $C_6$ hydrocarbons; methyl formate; and mixtures thereof.

15. An improved intermediate for a polymer foam composition comprising:

(a) a polyol, an isocyanate, or a resole; and (b) an effective amount of a hydrogen bond forming blocking agent to reduce the permeation of air into the foam or slow down the escape of said blowing agent from the foam; wherein said blocking agent comprises ether, ester, or ketone groups, and said ether is a member selected from the group consisting of sucrose polyether polyols, aminopolyether polyols, polypropylene glycol polyether polyols, polyethylene glycol polyether polyols, glyme, diglyme, triglyme and tetraglyme, mono-, di- and tripropylene glycol methyl ethers and ether acetates; and mixtures thereof, wherein the blowing agent is a material selected from the group consisting of $CHClF_2$, $CH_2F_2$, $CHCl_2CF_3$, $CHClFCClF_2$, $CHClFCF_3$, $CHF_2CF_3$, $CHF_2CHF_2$, $CH_2FCF_3$ and mixtures thereof; and (c) said blowing agent optionally further comprises at least one additional blowing agent.

16. An improved intermediate for a polymer foam composition of claim 15 wherein said hydrogen bonding blocking agent is selected from the group consisting of:
Polyethylene glycol mono- and dioleates;
Polyethylene glycol monostearates;
Polyethylene oxide sorbitan monostearates and tristearates;
Polyethylene oxide fatty acid amides;
dimethyl adipate, succinate and glutarate;
Ketones and polyketone polymers; and mixtures thereof.

17. A polyol-containing component for a thermoset polymer foaming composition comprising:

(a) a hydrogen-containing halocarbon; and (b) an effective amount of a polyol to produce a thermoset foam when reacted with an A-side, and to simultaneously reduce the permeation of air into the foam or slow down the escape of blowing agent from the foam; wherein said polyol is selected from the group consisting of polyethylene glycol, polypropylene glycol, ethylene oxide/propylene oxide copolymer, sucrose polyol, polyol containing ether, ester or ketone groups, and mixtures thereof, wherein said ether is a member selected from the group consisting of sucrose polyether polyol, amino polyether polyols, polypropylene glycol polyether polyols, polyethylene glycol polyether polyols, glyme, diglyme, triglyme and tetraglyme, mono-, di- and tripropylene glycol methyl ether and ether acetates: and mixtures thereof, wherein the blowing agent is a material selected from the group consisting of $CHClF_2$, $CH_2F_2$, $CHCl_2CF_3$, $CHClFCClF_2$, $CHClFCF_3$, $CHF_2CF_3$, $CHF_2CHF_2$, $CH_2FCF_3$ and mixtures thereof; and (c) said blowing agent optionally further comprises at least one additional blowing agent.

18. A B-side thermoset polymer foaming composition of claim 17 wherein said additional blowing agent gas is selected from the group consisting of:
$CFCl_3$; $CF_2Cl_2$; $CCl_2FCClF_2$; $CClF_2CClF_2$; $CCl_2FCH_3$; $CClF_2CH_3$; $CH_2FCH_2F$; $CH_3CF_3$; $CHF_2CH_3$; $CO_2$; $C_3$ to $C_6$ hydrocarbons; methyl formate; and mixtures thereof.

19. A thermoset polymer foam composition produced by reacting an isocyanate A-side in the presence of a hydrogen-containing halocarbon; and an effective amount of a polyol to produce a thermoset foam and to simultaneously reduce the permeation of air into the foam or slow down the escape of blowing agent from the foam; wherein said polyol is selected from the group consisting of polyethylene glycol, polypropylene glycol, ethylene oxide/propylene oxide copolymer, sucrose polyol, polyol containing ether, ester or ketone groups, and mixtures thereof, wherein said ether is a member selected from the group consisting of sucrose polyether polyol, aminopolyether polyols, polypropylene glycol polyether polyols, polyethylene glycol polyether polyols, glyme, diglyme, triglyme and tetraglyme, mono-, di- and tripropylene glycol methyl ethers and ether acetates: and mixtures thereof, wherein the blowing agent is a material selected from the group consisting of $CHClF_2$, $CH_2F_2$, $CHCl_2CF_3$, $CHClFCClF_2$, $CHClFCF_3$, $CHF_2CF_3$, $CHF_2CHF_2$, $CH_2FCF_3$ and mixtures thereof.

20. A thermoset polymer foam composition of claim 19 Wherein said additional blowing agent gas is selected from the group consisting of:
$CFCl_3$; $CF_2Cl_2$; $CCl_2FCClF_2$; $CCl_2FCClF_2$; $CCl_2FCH_3$; $CClF_2CH_3$; $CH_2FCH_2F$; $CH_3CF_{23}$; $CHF_2CH_3$; $CO_2$; $C_3$ to $C_6$ hydrocarbons; methyl formate; and mixtures thereof.

21. A method of manufacturing a closed cell foam comprising the steps of:

(a) admixing an effective amount of a hydrogen-containing halocarbon blowing agent to the B-side component of a polyurethane or polyisocyanurate foam sufficient to hydrogen bond at least a portion of said halocarbon with a polyol in said B-side component, thereby reducing the permeation of the halocarbon with a polyol in said B-side component, thereby reducing the permeation of the halocarbon from the foam wherein said polyol is selected from the group consisting of polyethylene glycol, polypropylene glycol, ethylene oxide/propylene oxide copolymer, sucrose polyol, polyol containing ether, ester or ketone groups, and mixtures thereof, wherein said ether is a member selected from the group consisting of sucrose polyether polyol, aminopolyether polyols, polypropylene glycol polyether polyols, polyethylene glycol polyether polyols, glyme, diglyme, triglyme and tetraglyme, mono-, di- and tripropylene glycol methyl ethers and ether acetates; and mixtures thereof;

(b) contacting said admixture of step (a) with an effective amount of an A-side component of a polyurethane or polyisocyanurate foam for sufficient time and temperature to produce foaming; and (c) recovering a closed-cell foam; wherein the blowing agent is a material selected from the group consisting of $CHClF_2$, $CH_2F_2$, $CHCl_2CF_3$, $CHClFCClF_2$, $CHClFCF_3$, $CHF_2CF_3$, $CHF_2CHF_2$, $CH_2FCF_3$ and mixtures thereof; and (d) said blowing agent optionally further comprises at least one additional blowing agent.

22. A method of claim 21 further comprising admixing a said additional blowing agent gas to said B-side wherein said additional blowing agent gas is selected from the group consisting of:

$CFCl_3$; $CF_2Cl_2$; $CCl_2FCClF_2$; $CClF_2CClF_2$; $CCl_2FCH_3$; $CClF_2CH_3$; $CH_2FCH_2F$; $CH_3CF_3$; $CHF_2CH_3$; $CO_2$; $N_2$; $C_3$ to $C_6$ hydrocarbons; methyl formate; dimethyl ether; and mixtures thereof.

23. A method of claims 21 wherein said hydrogen-containing halocarbon blowing agent comprises 1,1,1,2-tetrafluoroethane.

24. A method of claim 21 wherein said hydrogen-containing halocarbon blowing agent comprises 1,1,1,2-tetrafluoroethane and water is added to produce, in situ, a second blowing agent comprising carbon dioxide.

25. A method of manufacturing a closed cell foam comprising the steps of:

(a) admixing an effective amount of a blowing agent comprising 1,1,1,2-tetrafluoroethane to the B-side component of a polyurethane or polyisocyanurate foam sufficient to hydrogen bond at least a portion of said blowing agent with the polyol in said B-side component wherein said polyol is selected from the group consisting of polyethylene glycol, polypropylene glycol, ethylene oxide/propylene oxide copolymer, sucrose polyol, polyol containing ether, ester or ketone groups, and mixtures thereof, wherein said ether is a member selected from the group consisting of sucrose polyether polyol, aminopolyether polyols, polypropylene glycol polyether polyols, polyethylene glycol polyether polyols, glyme, diglyme, triglyme and tetraglyme, mono-, di- and tripropylene glycol methyl ethers and ether acetates; and mixtures thereof, thereby reducing the permeation of said blowing agent from the foam;

(b) contacting said admixture of step (a) with an effective amount of an A-side component of a polyurethane or polyisocyanurate foam for sufficient time and temperature to produce foaming; and (c) recovering a closed-cell foam.

26. A method of claim 25 wherein said B-side component admixed with an effective amount of said blowing agent, further comprises an effective amount of water to produce, in situ a second blowing agent comprising carbon dioxide.

27. The method of claim 10, wherein said adding comprises preblending the blocking agent with the polymer prior to expanding the polymeric phase.

28. The method of claim 10, wherein said adding comprises mixing the blocking agent with the blowing agent prior to expanding the polymeric phase.

* * * * *